No. 739,240. PATENTED SEPT. 15, 1903.
S. WACHTL.
PHOTOGRAPHIC CAMERA.
APPLICATION FILED APR. 9, 1900.
NO MODEL. 2 SHEETS—SHEET 1.
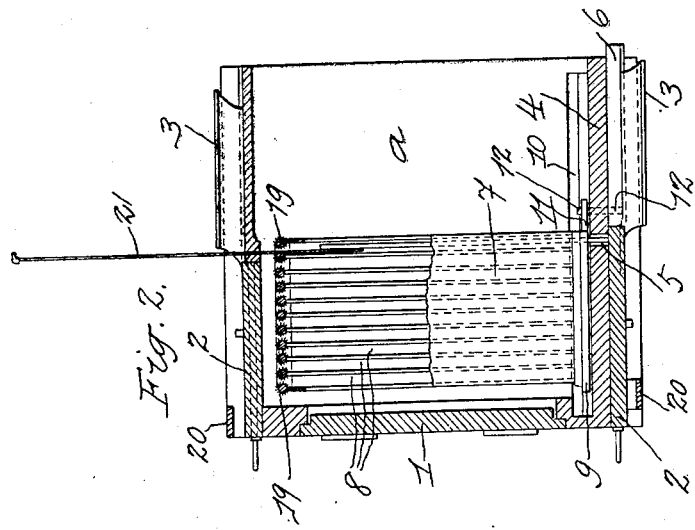
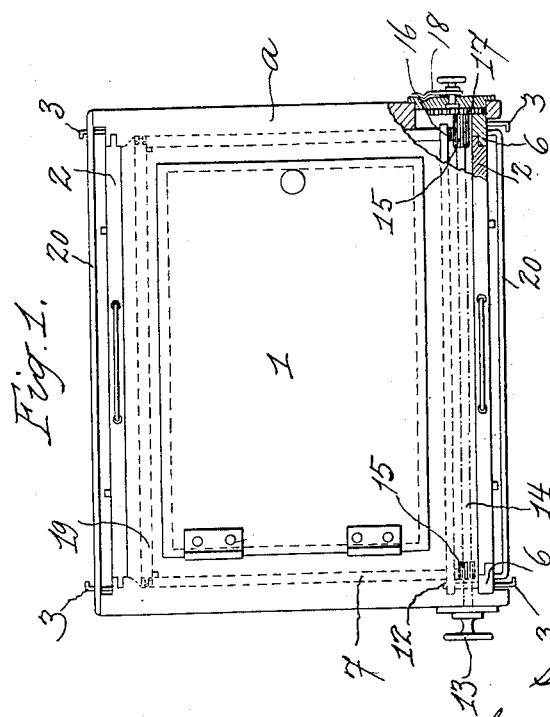

No. 739,240. PATENTED SEPT. 15, 1903.
S. WACHTL.
PHOTOGRAPHIC CAMERA.
APPLICATION FILED APR. 9, 1900.
NO MODEL. 2 SHEETS—SHEET 2.
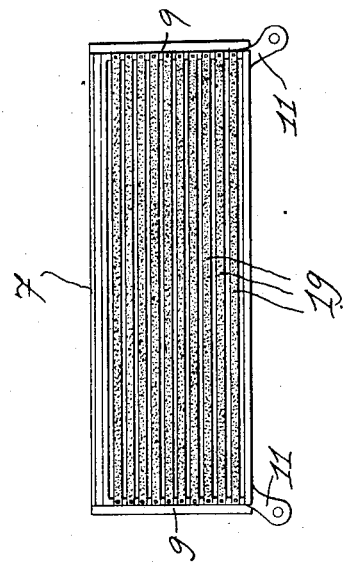
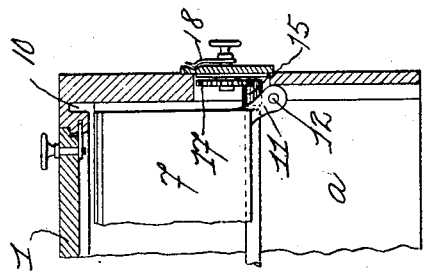
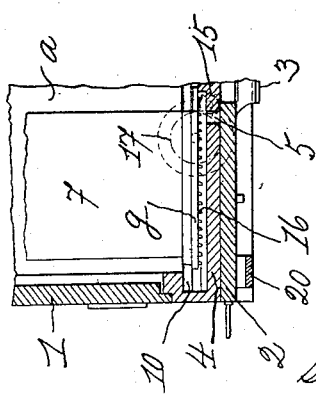

No. 739,240.                                    Patented September 15, 1903.

UNITED STATES PATENT OFFICE.

SIEGFRIED WACHTL, OF VIENNA, AUSTRIA-HUNGARY, ASSIGNOR TO LUDWIG HERZ, OF VIENNA, AUSTRIA-HUNGARY.

PHOTOGRAPHIC CAMERA.

SPECIFICATION forming part of Letters Patent No. 739,240, dated September 15, 1903.

Application filed April 9, 1900. Serial No. 12,198. (No model.)

*To all whom it may concern:*

Be it known that I, SIEGFRIED WACHTL, a subject of the Emperor of Austria-Hungary, residing at Vienna, in the Province of Lower Austria, in the Empire of Austria-Hungary, have invented certain new and useful Improvements in Photographic Cameras; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

The camera forming the object of the present invention is characterized by a magazine which is arranged in its interior, is regulated from outside, and can hold simultaneously any desired number of sensitive plates which are automatically dusted when fed into the camera. By means of a slide those plates which are situated behind the foremost one exposed to the light are excluded from the light, while after the exposition this foremost plate by the displacement of the magazine is moved on to a slit in the bottom of the box and through that can drop from the camera as soon as a slide covering this slit is pulled back. The annexed drawings show a camera provided with such a magazine.

Figure 1 is a rear elevation of the camera, a part of it being shown in a vertical section. Fig. 2 is a vertical longitudinal section through the camera, the magazine being shifted forward for the distance occupied by two plates. Fig. 3 shows the device for regulating the position of the magazine from the outside. Fig. 4 shows a detail of the camera in a horizontal section. Fig. 5 shows the magazine in an upper elevation.

The camera *a* is provided at its rear with a door 1. In the top of the camera is arranged a movable slide 2, provided with extensions 3, formed by profiled bars. These extensions form the object of a separate patent application and have the purpose to close tightly the joints between the camera-box and plate-magazine placed thereon when the slide 2 is pulled back, so as to prevent the accidental penetration of light through the same.

In the fixed bottom 4 of the camera is provided a slit 5, allowing one plate at a time to pass, and below this fixed bottom is arranged a second bottom 6, movable in the direction of the length of the camera. This bottom 6 is provided with a slide 2, having the same arrangement as the slide 2 in the top of the camera.

Within the camera is arranged the plate-magazine 7, consisting of two side walls connected together, whose grooves 8, facing each other, serve for inserting the sensitive plates. This magazine is movable in the direction of the length of the camera and is guided by means of the guiding-ribs 9 in grooves 10 of the side walls of the camera. To the magazine are affixed extensions 11, into which engage the pins 12, fastened on the movable bottom 6, so that the latter and the magazine are coupled, and therefore execute the same movements. The movable bottom is actuated by turning the button 13, whose shaft 14 is provided with pinions 15, engaging into the racks 16 of the magazine 7. The turning of the shaft is transferred by the pinion 17 upon an indicator or scale 18, that indicates the position for the time being of the magazine or the number of plates still contained therein. The magazine is besides provided on its upper part with a number of parallel rods 19, covered with chenille, velvet, plush, or similar material. Between these rods the plates must pass in order to get into the magazine, so that the plates before falling into the camera automatically undergo a preliminary cleaning.

On the upper part of the camera-casing is arranged a fixed ledge 20, against which are bearing the extensions 3 of the upper slide 2 when it is pushed out, so that a complete removal of the slide is prevented. The same arrangement exists on the lower side of the camera, with the difference that the ledge 20 is here fixed to the movable bottom 6.

The camera may be provided with one of the above slides 2 only, either on the bottom or on top, if it be desired to move the plates out and in from one side only of the camera.

The plates may be fed into the magazine 7 either all at once or successively one after the other after each single exposition. In order to replace the plate after each exposition into the plate-magazine, this latter is placed before the lower ledge 20 on the movable bottom 6 or on the lower slide 2. By pulling out the slide 2 the slit 5 is opened, so that the plate which has undergone the operation of exposure drops into the receptacle below.

In the following the whole precedure of working is described *seriatim*. After inserting the prepared plate into the magazine it is moved forward so far that the plate already in the magazine is pushed into the position required for a correct picture. Fig. 2 shows this position of the magazine. If several plates are simultaneously in the magazine, then all the plates behind the foremost one intended for exposure must be shut off from the light. For this purpose there is provided a slide 21, fitting in a slit of the cover or of one of the side walls of the camera, which is inserted into the camera behind the plate which is intended for exposure and shuts this plate off from those following behind. This slide may also be pushed into the camera-casing from the side, or it may be dispensed with altogether if the plates be provided on the reverse side with an opaque coating. After the completed exposure the plate is dropped into the plate-magazine fitted to the bottom side of the camera by pulling out the lower slide 2. As every groove of the magazine can receive only one plate, the plate-receptacle from which the plates fall immediately into the described magazine must hold them in the distances apart exactly corresponding to the distances of the grooves in the magazine. For this purpose the plate-receptacle is provided with exactly the same kind of grooves for the plates as the magazine.

I claim—

1. The combination with a camera having a bottom provided with a transverse slot therein, a slide to cover said slot and said camera provided with lateral grooves in its side walls, a movable bottom, pins therein projecting into the camera, and a rack and pinion to move said movable bottom; of a plate-magazine, guide-ribs thereon to take into said lateral grooves, extensions to take over said pins, whereby said magazine will be moved to cause the plates to register with said slot, substantially as set forth.

2. The combination with a camera having a bottom provided with a transverse slot therein, and said camera provided with lateral grooves in its side walls and a transverse slot in its top, a movable bottom provided with a transverse slot therein, a slide to cover said slot and said camera provided with lateral grooves in its side walls, a movable bottom, pins in said bottom; of a plate-magazine having vertical grooves in its side walls for the reception of plates, rods extending across the magazine and between adjacent grooves, means on said rods to dust the plates as they are inserted, guiding-ribs on the magazine to take into the lateral grooves in the side walls of the camera and extensions to take over said pins, whereby the magazine is moved to successively bring the plates into register with the transverse slot in its bottom, substantially as set forth.

3. The combination with a camera having a bottom provided with a transverse slot therein, and said camera provided with lateral grooves in its side walls and a transverse slot in its top, a movable bottom provided with a transverse slot therein, a slide to cover said slot and said camera provided with lateral grooves in its side walls, a movable bottom, pins in said bottom; of a plate-magazine having vertical grooves in its side walls for the reception of plates, rods extending across the magazine and between adjacent grooves, a slide inserted through the top of the camera positioned to pass behind the foremost plate in the magazine, means on said rods to dust the plates as they are inserted, guiding-ribs on the magazine to take into the lateral grooves in the side walls of the camera and extensions to take over said pins, whereby the magazine is moved to successively bring the plates into register with the transverse slot in its bottom, substantially as set forth.

In testimony that I claim the foregoing as my invention I have signed my name in presence of two subscribing witnesses.

SIEGFRIED WACHTL.

Witnesses:
  JOSEF RUBRESCH,
  ALVESTO S. HOGUE.